United States Patent

Mallinson et al.

[11] 3,914,011
[45] Oct. 21, 1975

[54] CASCADED RELAY FOR IMPROVED SCHEIMPFLUG PROBE

[75] Inventors: Richard B. Mallinson; Richard A. Mecklenborg, both of Binghamton, N.Y.

[73] Assignee: The Singer Company, New York, N.Y.

[22] Filed: Sept. 10, 1974

[21] Appl. No.: 504,827

[52] U.S. Cl. .................. 350/50; 350/252; 350/286
[51] Int. Cl.² ................... G02B 17/00; G02B 23/02
[58] Field of Search ............ 350/50, 51, 49, 45, 47, 350/46, 286, 287, 252, 202; 355/52, 51, 66; 353/69, 70, 5; 35/12 N

[56] References Cited
UNITED STATES PATENTS

| 3,574,459 | 4/1971 | Hartwig | 355/66 |
| 3,639,034 | 1/1972 | Larussa | 350/50 |
| 3,655,260 | 4/1972 | Bartucci et al. | 350/50 |
| 3,778,134 | 12/1973 | Welham | 355/52 |
| 3,827,791 | 8/1974 | Mecklenborg | 355/52 |

OTHER PUBLICATIONS
Emsley, *The Optician*, "Reflecting Prisms," Vol. 143, No. 3711, May, 1962, p. 481–484.

*Primary Examiner*—Ronald J. Stern
*Assistant Examiner*—Jon W. Henry
*Attorney, Agent, or Firm*—James F. Duffy; James C. Kesterson

[57] ABSTRACT

An improved Scheimpflug relay for use in an optical probe includes relay lenses mounted on a common shaft with the relay lens axes transverse to the longitudinal axis of the probe, a zooming field lens structured to produce a collimated intermediate image in its central portion, positive field curvature correction consisting essentially of paired Galilean telescopes placed back-to-back, and optical path folding means. The arrangement of lenses and pathfolding means is such that one common drive may be used to achieve both relay lens tilt and all path length compensation related therewith.

12 Claims, 11 Drawing Figures

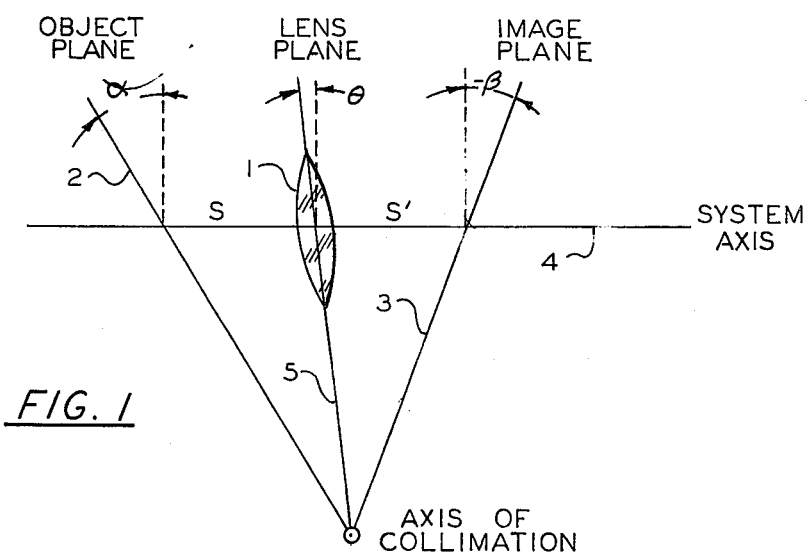
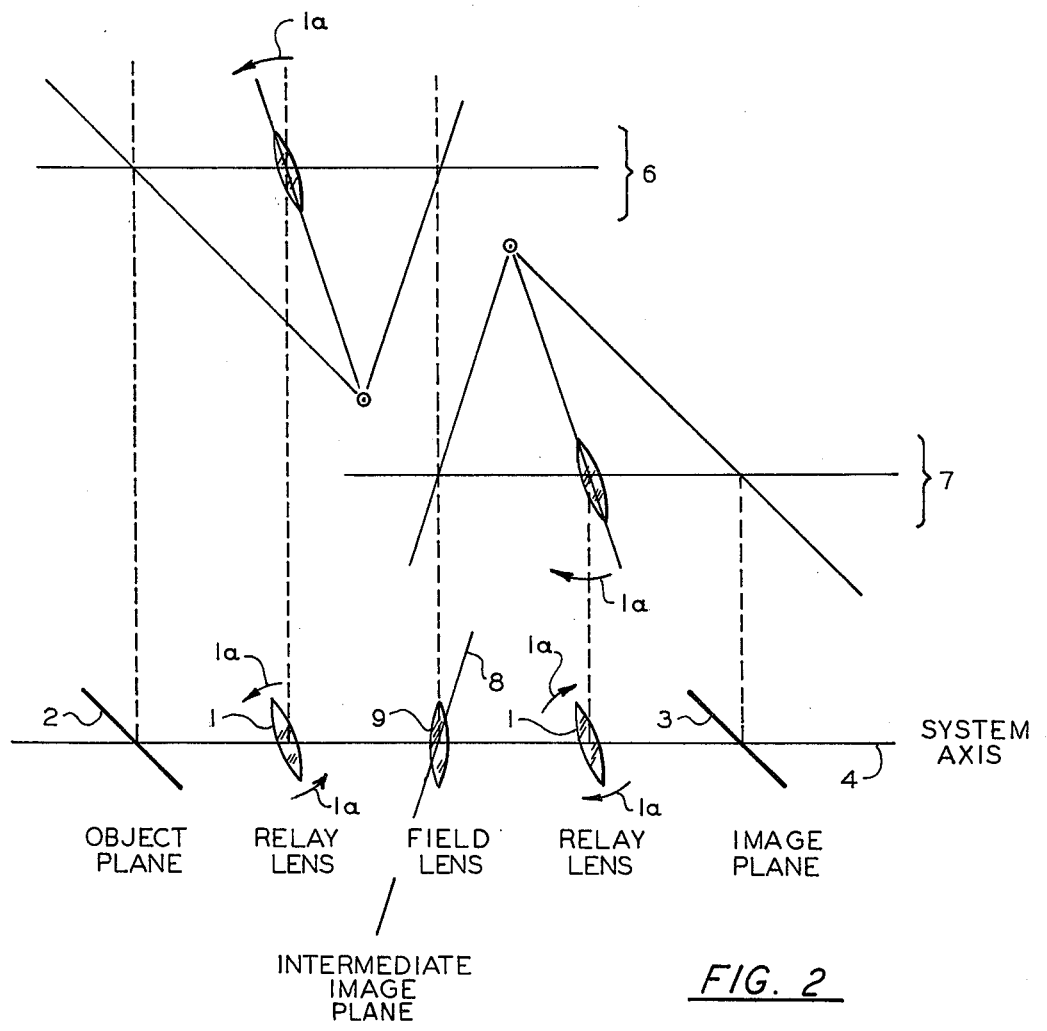

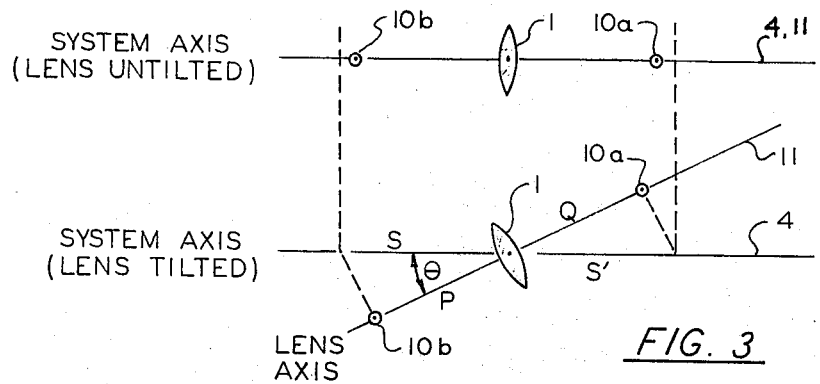
FIG. 3
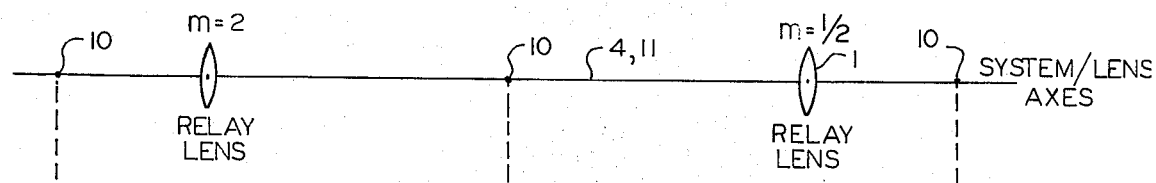
FIG. 4A
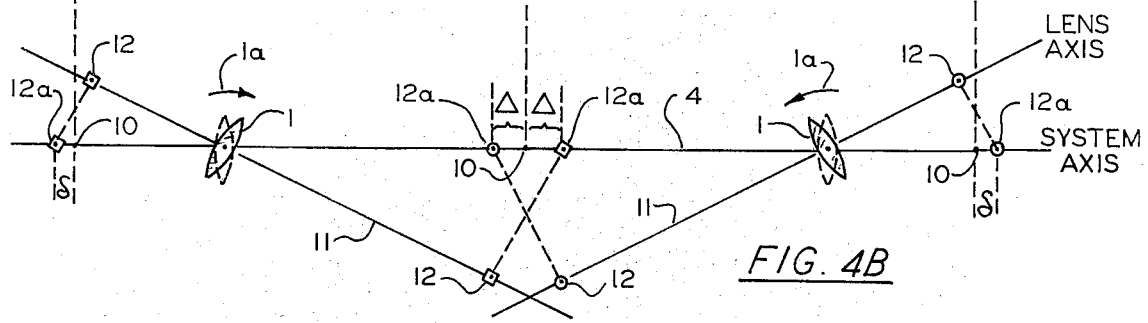
FIG. 4B
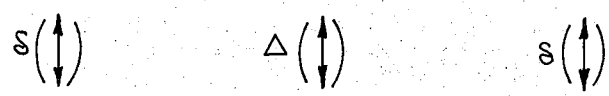
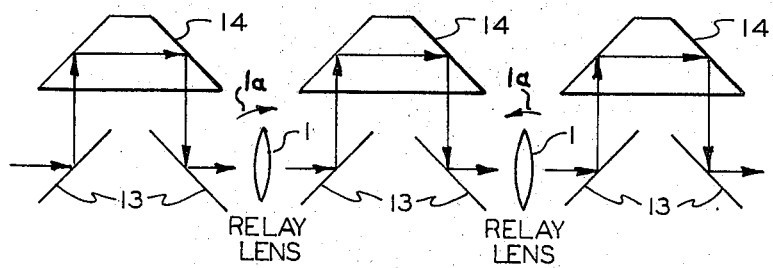
FIG. 5
*Prior Art*

CASCADED RELAY FOR IMPROVED SCHEIMPFLUG PROBE

BACKGROUND OF THE INVENTION

This invention relates to optical systems used for viewing models of terrain in association with aircraft flight simulation and more particularly with means for reducing the number of mechanical articulations which must be coordinated and servo controlled when multistage Scheimpflug correction is provided said systems.

The ability of the Scheimpflug-relay optical probe to produce erect images of near infinite depth of field lends itself to use with aircraft simulator training devices where the probe is "flown" over a scale model terrain and the scale factor causes the apparent aperture of the objective lens to be very large, with subsequent reduction in depth of field. The probe consists of a series of lenses, certain of which may be tilted to erect the image and other non-tiltable lenses which are either fixed in position or whose position may be translated along the optical axis of the probe to compensate for changes induced by the tilting lenses as well as those resulting from variations in altitude and attitude of the probe. If infinite depth of field is to be realistically approached, the movement of the various lenses comprising the probe and the length of the optical path must be controlled precisely.

When an optical probe is used to scan a scale model of the ground in conjunction with aircraft flight simulation trainers, the optical axis of the probe normally lies along the simulated flight path of the trainer, i.e., above and near parallel to the surface of the scale model being scanned. Of necessity then, the object plane, that of the model, is at an angle to the lens plane of the probe and, as taught by Scheimpflug, the image is formed on a plane inclined to the axis of the lens system of the probe. (See U.S. Pat. No. 751,347 issued Feb. 2, 1904.)

Scheimpflug's early teachings have been extrapolated by latter day technicians and applied to the problems of (1) erecting the inclined plane of the image; (2) eliminating trapezoidal distortion; while (3) retaining near infinite depth of field in the final image.

The basis for the theoretical design of an optical probe using Scheimpflug correction is the so-called Scheimpflug condition:

The plane containing the original object and the plane containing the projected image, as well as the principal plane of the objective lens all intersect along one common line defined by Scheimpflug as the axis of collimation.

Armed with knowledge of the Scheimpflug condition persons skilled in the art of optical probe design have derived the necessary relations to predict the degree of tilt of internal lenses and the variation of optical path length required to meet the problems enumerated above.

However, the complexity of these systems has proven costly and often the mechanical adjustments have been imprecise or precision has been sacrificed to reduce the cost.

As an example of the complexity of prior art devices, one may consider that each tilting lens was mounted on an individual shaft which had to be rotated independent of the rotation of other lens shafts. Optical path length adjustments were individually controlled and separate control of the focal length of various lenses had to be incorporated as well. These methods as already noted have proven costly and at best imprecise.

It is therefore an object of this invention to simplify the lens system arrangement of the Scheimpflug probe.

It is another object of this invention to derive a simple, relatively inexpensive drive system having high precision.

This disclosure teaches how those objectives, and others made obvious by the reading hereof, may be achieved.

SUMMARY OF THE INVENTION

In the invention disclosed herein all relay lenses of one or more stages are mounted on a common shaft and the magnification of the stages chosen so that the tilt angle required of any given relay lens will be the same as that required of all other relay lenses. Field lenses and field flattening lenses are so arranged that image collimation is not destroyed when optical path lengths and the focal length of zooming field lenses are adjusted. All mechanical adjustments, such as tilt of relay lenses, variation of field lens focal lengths and changes in optical path lengths may be achieved using only one drive motor and simple linkages therefrom.

DESCRIPTION OF THE DRAWINGS

FIG. 1 illustrates in simplest form a Scheimpflug relay stage;

FIG. 2 shows the generation of two Scheimpflug relay stages in cascade;

FIG. 3 illustrates the effect of relay lens tilt on the locus of image and object points;

FIGS. 4A and 4B indicate the apparent motion of image and object points with tilt of the relay lenses of a two stage Scheimpflug relay.

FIG. 5 illustrates prior art approach to correcting for apparent motion of image and object points.

DESCRIPTION OF THE INVENTION

Figure 6:
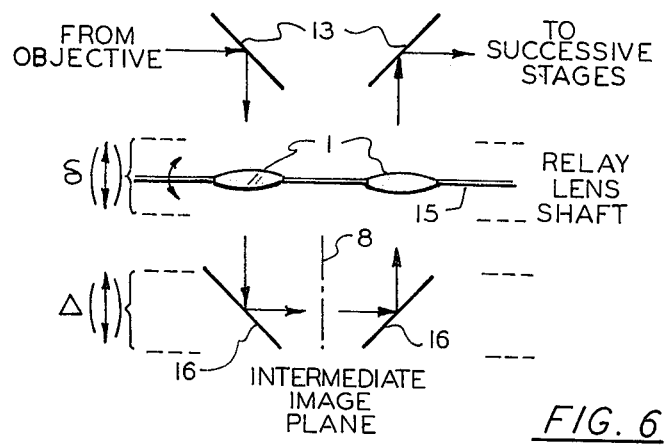
FIG. 6 shows the method of the present invention for correcting these apparent motions and technique of mounting the relay lenses off the longitudinal axis of the probe.

Because the invention disclosed herein is a major improvement over prior existing art in that it reduces cost and complexity and increases the precision of Scheimpflug relay stages of optical probes, it is necessary that additional, more detailed, background concerning Scheimpflug relays be presented, so that an understanding of the invention will be facilitated.

This additional background information requires the use of exemplary figures and thus is included at this point in the disclosure.

DETAILS OF THE PRIOR ART

A simple Scheimpflug relay stage is shown in FIG. 1 along with the angular relationships necessary to satisfy the conditions set out by Scheimpflug.

Inherent in the equation associated with FIG. 1,
$\tan \beta = - [ m \tan \alpha - (1 + m) \tan \Theta ]$;
$m$ = magnification;
is the fact that tilting the lens 1 in the direction of the object plane 2 will reduce the magnitude of the tilt of the image plane 3. Both the negative sign before the equation and the FIG. 1 illustration itself indicate that, for all practical cases, the tilt of the image plane 3 is in the reverse direction of that of the object plane 2.

In the special case where the magnification of the stage is unity, the distances along the system axis 4 from the object plane 2 to the principal plane of the lens 5 and that distance from said principal plane 5 to the image plane 3 will be equal. In that case, and given no tilt of the lens 1, the angular tilt $\beta$ of the image plane will be equal in magnitude to $\alpha$ the tilt of the object plane, though still opposite in direction.

FIG. 2 shows in simplistic fashion the generation of a Scheimpflug probe made up of two optical systems 6 and 7 in cascade. A study of FIG. 2 will make apparent the fact that when Scheimpflug stages are cascaded, any given image plane such as 3 will be tilted in a direction which is the reverse of the tilt of the plane, e.g., 8, of the intermediate image in the preceding optical stage. For this reason, to correct image tilt, the tiltable lenses 1 must alternate direction of tilt as one progresses along the system axis 4. The direction of tilt necessary to erect the image plane 3 is indicated by curved arrows 1a about the tiltable lenses 1 of FIG. 2.

FIG. 2 also shows that the tiltable lenses 1 are denoted as relay lenses and that a non-tiltable lens 9 placed where the intermediate image plane 8 crosses the system axis is denoted a field lens. Not shown is the objective lens of the system nor the final imaging lens.

The objective lens is typically telecentric: that is, its pupil is centered and located at a focal point. This means that chief rays emerging from the objective lens will be parallel to the system axis and therefore the image will remain constant in size regardless of focus. The image transmitted by the objective is relayed by each tiltable lens onto the object-plane surface of the following tiltable lens, thus the appellation: "relay lenses."

The "field lenses" preserve the optical field which has been produced by the objective lens. Without the field lens, the rays traversing the various relay lenses would tend to spread beyond the confines of the optical system with the result that the final image would be vignetted, i.e., distinct in its central portion but fuzzy toward the outer peripheral areas.

The field lenses also must precisely image the exit pupil of one realy lens unto the entry pupil of the following relay lens in order to correct for the trapezoidal distortion resulting from imaging a tilted object.

In practice a field lens will also be interposed between the objective lens and the first relay lens, the distance between the objective and that field lens being determined as a function of the pitch angle of the probe.

FIG. 3 illustrates the effect of lens tilt $\Theta$ on the locus of the image points 10a and object points 10b as they are projected from the axis 11 of tilted lens 1 onto the system axis 4 of the probe. As can be seen from the illustration, there is an apparent movement of these points along the system axis 4 as the lens 1 is tilted.

Since magnification $m$, along the system axis is defined as the ratio of the distances S and S' of the image and object points from the principal plane of the lens, it is seen that tilting the lens 1 effects a change in the magnification of the system. In a practical system this variation must be compensated for so that magnification remains constant.

The equation of FIG. 3

$$S = P \sec \Theta$$

indicates that the distances between object point and lens plane along the system axis varies as the secant of the tilt angle $\Theta$. A correction factor to eliminate lens-tilt-induced magnification changes will have to vary as the secant of $\Theta$. This correction, to be applied to adjustments made in the optical path length of the system, shall be herein termed, "Correction Condition 1" and discussed in greater detail later.

Correction Condition 1 however leads to complications when its effect on the performance of the field lens is concerned. Remembering that the field lens must precisely image the exit pupil on one relay lens onto the entry pupil of the following lens and that correction condition 1 has caused a change in the optical path length between these pupils it is necessary that adjustments be made in the focal length of the field lens to compensate for the changed distance between the subject relay lens pupils. This correction shall be herein termed "Correction Condition 2."

The field lenses, while necessary to rectify and erect the images, further complicate matters by adding to the already positive field curvature possessed by most lenses which produce real images. This curvature is compensated in accord with prior art by constructing a field lens using a combination of lens elements consisting of both positive and negative elements such that a negative contribution to the field curvature is introduced while still preserving a net positive power for the field lens combination. However, the embodiment of this lens combination, according to prior art techniques destroys the effectiveness of correction condition 2. This invention, it is important to note, teaches also of "Correction Condition 3," which obviates the field correction problems inherent in prior art correction attempts.

Before proceeding to a discussion of how each of the three compensating conditions is achieved, it is well to note that although the teachings here disclosed are applicable to varied, independent, combinations of image tilt, lens tilt, and magnification of each stage; two simplifying embodiments are herein considered and disclosed. In both cases, the magnitude of the tilt angle of the relay lenses is the same for all cascaded stages (although the direction of tilt will reverse from stage to stage as already discussed and as illustrated in FIG. 2).

In the first case, the on-axis magnification for all stages is set at unity. In this instance the only variable characterizing the entire cascaded system is the lens tilt magnitude. Setting the magnification of each stage at unity allows cascading any number of stages without causing the final image size to change. This concept simplifies modular design and permits the addition at will of supplemental Scheimpflug stages with minimum modification of the existing components of the probe.

In the second case, the modular concept is implemented by providing two Scheimpflug stages in each module. By setting the on-axis magnification on the first stage equal to a selected value $m$, while setting the magnification of the second stage equal to $1/m$, the modular combination will have an effective magnification of unity and may be inserted into the probe without affecting final image size. In this two-stage modular concept two parameters characterize the system. These parameters are magnification, $m$, and lens tilt magnitude.

Before the technique of achieving the corrections is set forth the correction conditions are summarized for ease of reference.

Correction Condition 1 offsets the variation in magnification caused by tilting the relay lenses. In effect, this correction assures that the distance from the principal plane of the relay lens to the image plane, as measured along the system axis, will vary as the secant of the tilt angle of the relay lens.

Correction Condition 2 offsets the effect correction condition 1 applied to the relay lenses has on the requirements of the field lenses. Thus, as the secant-of-the-tilt-angle-correction is applied to the relay lenses, so too the focal length of the field lens, and the position of the field lens as well, must be corrected by the same secant related factor to assure that (1) the relay of the pupil from one tiltable lens to the next is accomplished precisely, and (2) the principal plane of each field lens intersects the system axis at the same point as the plane of the intermediate image between tilting relay lenses.

Correction Condition 3 provides field curvature compensation without destroying the effectiveness of correction condition 2.

Two simple Scheimpflug stages are illustrated in FIGS. 4A and 4B. The two stage modular embodiment already discussed is employed, wherein the magnification of the stages is $m$ and $1/m$ respectively so that the effective magnification of the module is unity.

FIG. 4A shows the relay lenses 1, in an untilted stage. Here, the axis 11 of each lens and the system axis 4 coincide. Image and object points are indicated at points 10 along the coincident axes 4 and 11.

FIG. 4B shows lenses 1 tilted and the position 12 of the image and object points along the lens axes 11 have been projected back onto the system axis 4 as position 12a. An apparent shift of these points from point 10 to point 12a along the system axis is noted as a result of tilting relay lenses 1. These shifts are designated $\Delta$ and $\delta$ in FIG. 4B. In practice these apparent shifts, $\Delta$ and $\delta$ may be eliminated by changing the optical path length to cause the projected object and image points to coincide with their original position along the system axis so that the on-axis-magnification of the system is preserved.

FIG. 5 shows the method most frequently employed, using prior art techniques, to adjust the optical path length to eliminate magnification changes caused by lens tilt variations: The relay lenses 1 are each pivoted about a separate shaft and driven in opposite tilt directions. A combination of reflective surfaces 13, to fold the optical path, and prisms 14, to further fold and to individually adjust the path length, was employed in the prior art.

DESCRIPTION OF THE PREFERRED EMBODIMENT

It is important to note here that a Scheimpflug probe being flown over a model landscape for use in simulating aircraft flight has to be maneuvered in height and attitude in response to movement of the controls of the aircraft simulator by the pilot-trainee. If the method employed to tilt the relay lenses and to adjust the optical path lengths is complex and uses a large volume of space it imposes a severe burden upon the height and attitude controlling mechanisms of the probe. In other words, the more compact the package of relay and field lenses, and the simpler the arrangement for adjusting lens tilt and path length, the easier it is to maneuver the probe above the model landscape and still retain the precision control required.

FIG. 6 illustrates a preferred embodiment of the present invention which provides for correction condition 1 (tilt induced magnification changes). This embodiment at the same time reduces package size and simplifies the adjustment scheme while improving the precision of adjustment. Instead of mounting the relay lenses 1 transverse to the longitudinal axis of the probe, which requires a separate drive shaft for each relay lens, the relay lens are placed on a single shaft 15 which shaft is parallel to the longitudinal axis of the probe. The optical path is then folded as shown. In this manner, by rotation of a common shaft 15, alternate reverse tilts of the relay lenses are achieved with only one common drive mechanism. A study of FIG. 6 will show that a rotation of the lens shaft will cause the top part of one relay lens to rotate closer to the objective, while the top part of the other relay lens shown tilts away from the objective. Thus, alternate relay lenses tilt in opposite direction with respect to the objective lens even though the relay lenses are mounted on a common axis.

The intermediate image plane 8 is located centrally between two reflective surfaces 16, as FIG. 6 indicates. The field lenses, usually located at intermediate image plane 8 in prior art devices are omitted here for clarity of discussion. These reflective surfaces 16 are capable of being translated as shown by the arrows labeled $\Delta$. In practice, movement of reflective surfaces 16 effects a change in the optical path to correct for the $\Delta$ displacement from 10 to 12a of the image point due to lens tilt variations, as was shown in FIG. 4. To correct for the displacement denoted as $\delta$ in FIG. 4, the axis of the rotating shaft 15 of FIG. 6, upon which the relay lenses 1 are mounted, is similarly translatable as shown by the arrows labeled $\delta$.

The magnification of each module is unity in the embodiment here described. In this case, as may be verified by inspection of FIG. 4, the $\delta$ corrections are the same for all lenses employed, as are the $\Delta$ corrections. In addition, a definite, predetermined relationship exists between the translation of the reflecting surfaces 1 and the translation of the axis of rotation 15 of the relay lenses, depending on the magnification of each stage.

For example, if the magnification of each stage is unity the reflecting surfaces 16 will have to be translated a distance which is exactly twice that distance required of the relay lens shaft 15 translation. This is true because in this special case in which each stage has a unity magnification, the $\delta$ correction will exactly equal the $\Delta$ correction and translating the relay lens axis 15 to make the $\delta$ correction affects the optical path between the relay lenses 1 and the lower reflecting surfaces 16 of FIG. 6 and thus interacts with the $\Delta$ correction. This interaction of optical path adjustments is simple to determine even for the case in which successive stages have magnifications of $m_1, 1/m_1; m_2, 1/m_2; \ldots m_n, 1/m_n$.

Since the interaction of the δ and Δ corrections is predictable, it is possible to use a single driving means and appropriate linkages to translate both a multiplicity of relay lenses 1 and a multiplicity of reflecting surfaces 16 to simultaneously accomplish both δ and Δ corrections.

It is pointed out here that it is possible to achieve the δ correction by holding the relay lens shaft 15 fixed and translating the upper reflecting surfaces 13 of FIG. 6. However such movement would cause an offset at the input and output of the probe which in turn would have to be further compensated for.

Note that between any two lenses in this invention, FIG. 6, there are only two right angle bends in the optical path, whereas, between any two lenses using the prior art techniques shown in FIG. 5 there are four right angle bends. This is important since the entire Scheimpflug probe in the embodiment here disclosed is thus contained in a smaller package and is more easily rotated to provide attitude variations in response to movement of the simulator controls. With fewer reflective surfaces there is greater efficiency because of less light attenuation and there is less change of image distortion.

At this point the teaching of this invention has improved upon prior art Scheimpflug probes by (1) reducing the optical path length convolutions typical of prior art devices, (2) reducing to one single shaft 15 the number of rotating shafts required to tilt relay lenses 1 and (3) reducing to one the driving means required to translate both the reflecting surfaces 16 and the relay lenses 1.

The foregoing discussion however was simplified in that the field lenses were omitted from the exposition. It has been shown that tilting the relay lenses causes the need for compensation of optical path lengths to avoid magnification changes. These changes in path length conflict with the requirements that: (1) the distance between field lens and relay lenses be exactly set so that the pupil of one relay lens is precisely relayed to that of the next relay lens and that; (2) the principal plane of the field lens and the plane of the intermediate image shall intersect the system axis at the same point. Thus, having effected correction condition 1, it is now necessary to consider correction condition 2 whereby the focal length of the field lens as well as its position along the system axis are adjusted so that the two criteria established for the field lenses can be maintained.

According to prior art a typical method of providing for correction condition 2 would be to locate the field lens 9 at the intermediate image plane 8 shown in FIG. 2. The field lens 9 would be so emplaced that it could be moved along system axis 4 when the Δ correction was made. The focal length of field lens 9 could then be adjusted so that the pupil of one relay lens was imaged on the next. The complexity of adjustment of cascaded stages within a Scheimpflug relay optical probe may be reduced if the means employed to make the focal length adjustment of the field lenses may be the same means used to achieve the Δ correction. Since both the focal length and the Δ adjustments are in essence secant θ dependent optical path length variations, this invention discloses an embodiment which includes both adjustments when reflective surfaces 16 are translated. This embodiment makes use of symmetry and the fact that the field lens images the pupil of the relay lens at unity magnification.

Figure 7:
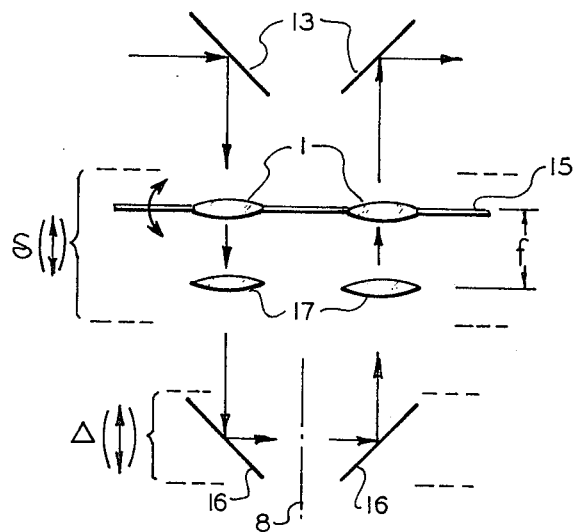
FIG. 7 illustrates the incorporation of field lenses as taught by the present invention.

As shown in FIG. 7 the field lens is split into two elemental lenses 17 each of which is located a distance $f$ from its respective relay lens 1. The distance $f$ is equal to the focal length of the elemental lens 17. This configuration results in a telecentric lens arrangement whereby the image from the relay lens 1 is collimated, that is, the rays are parallel and the image therefore appears to originate at infinity. Since each elemental lens 17 is identical, the field lens forms a symmetrical arrangement about the image.

The image of the pupil of one relay lens is imaged on the pupil of the next relay lens said image having traversed an apparently infinite distance. Variation of optical path between elemental lenses by movement of the lower reflectors 16 (the Δ correction, FIG. 7) will not alter the focus of these apparently infinitely separated pupils, however such variation will change the effective focal length of the field lens and may add to or cause trapezoidal distortion of the relayed image. to avoid this distortion problem the effective focal length of the field lens can simultaneously be considered and corrected for when the Δ correction is made by translating reflective surfaces 16. As noted earlier, the focal length of the field lens is corrected by the same secant θ-related-factor used to correct for tilt induced magnification changes (correction condition 1). Thus the two corrections may be combined in the one translation of the reflective surfaces 16.

As may be seen the cascaded relay Scheimpflug probe has by this invention been further simplified by achieving the field lens focal length correction using the same common means employed to correct for relay lens tilt.

Alluded to already is the fact that most lenses which produce real images also tend to introduce a positive field curvature. If the image were to be focused on a flat screen the center of the image field would be in focus but the edges would be blurred. Negative lenses produce virtual images which differ from a "real" image in that they cannot be projected onto a screen. Negative lenses introduce negative field curvature and are often employed to offset the positive field curvature of the system. When negative lenses are so employed it is necessary to introduce other positive lenses to preserve a real-image-producing system. The usual prior art method of simply placing a negative element at intermediate image plane 8 to introduce negative field curvature and placing a positive element to either side of the negative lens to preserve the real image greatly complicates the corrections required of an optical system employing tilting lenses and compensatory path lengths. It is apparent that placing a negative element at the intermediate image plane of FIG. 7, using prior art techniques of field curvature correction, would utterly destroy the pupil collimation of the variable path length between the elemental lenses 17 of the complex field lens. However, the collimation in the variable path length may be preserved using the embodiment now disclosed.

Figure 8:
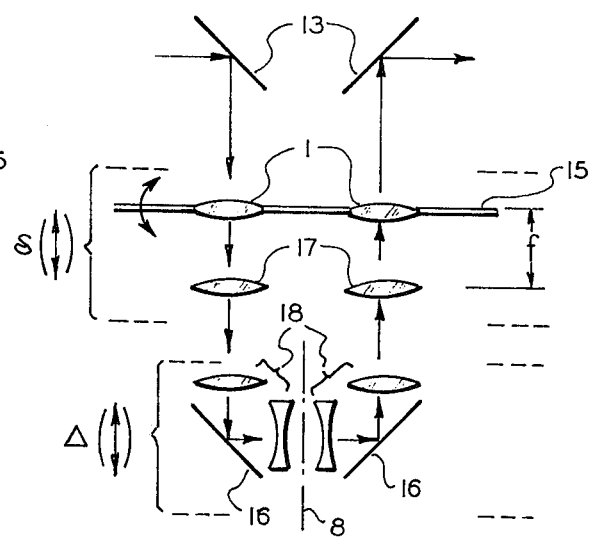
FIG. 8 illustrates a preferred embodiment of the teachings of the present invention showing folding and adjustment of optical path and incorporation of field lenses and field flattening lenses.

Consider the Galilean telescope with its negative element eyepiece and positive element objective. The image rays leave the eyepiece as a parallel bundle and the virtual image is at infinity, that is, the image is collimated. Such a device could be introduced between the elementary lenses 17 of the field lens to correct field curvature without destroying the pupil collimation in the variable path length. However the magnification of such a telescope is greater than unity. Therefore to preserve unity magnification throughout the probe, two such telescopes 18 are utilized back to back, that is, eyepiece to eyepiece, as shown in FIG. 8. The net result is that a collimated image of unity magnification having slight negative curvature is presented to the succeeding stage.

When the lower reflectors 16 of FIG. 8 are translated to correct for lens tilt magnification variations, the two Galilean telescopes 18 move with the reflectors, and the collimation of the image between elemental halves of the complex field lens is not affected by such movement.

Figure 9:
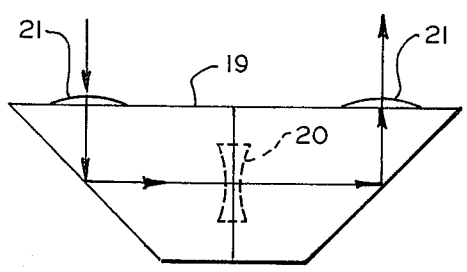
FIG. 9 shows a porro prism modified with field flattening lens elements.

Persons skilled in the art will recognize that FIG. 8 is drawn to emphasize that the field curvature correction elements 18 are equivalent to two Galilean telescopes placed back-to-back. To such persons it will be obvious that an equivalent but simpler arrangement using a single negative lens element at the intermediate image plane may be derived while still preserving the collimated image. Therefore, in another embodiment of this invention the optical surfaces comprising lower reflectors 16 of FIG. 8 are replaced with a porro prism 19, FIG. 9, which is modified internally as shown to provide a negative lens element 20 at the intermediate image plane and positive elements 21 at the normal entrance and exit faces of the prism which elements 20 and 21 comprise the two Galilean telescopes 18 discussed above. Additional elements may be superimposed upon the prism faces or on the internal concave faces, if necessary to achieve other required correction.

Figure 10:
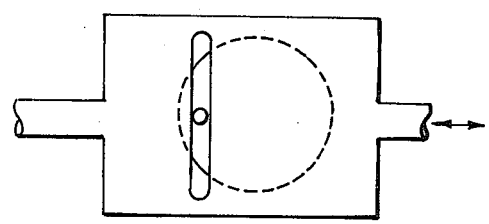
FIG. 10 illustrates a scotch yoke.

When Galilean telescopes are employed to correct for positive field curvature, the lens designer must remember to compensate for the contribution these telescopes make to the optical path length between the elemental lenses 17 of the field lens. However, it will be found that even with such compensation considered the tilt angle Θ dependence of the system is retained. It is thus convenient to derive the compensating translating motions of the lenses and reflectors by means of linkages which generate linear motion in response to a rotary input. Such a device, a scotch yoke, is depicted in FIG. 10. In this manner the servo requirement is reduced to a single servo drive for the Scheimpflug relay portion of the system.

As has been pointed out the exposition given here has been in terms of simple thin lenses. The lens designer will be aware that nodal separation and nodal shape of the actual lens elements used in the system will have to be considered in the system design.

A preferred embodiment of the invention has been described. It should be obvious to those skilled in the art that various changes and modifications may be made therein without departing from the invention. It is therefore intended to cover herein all such changes and modifications as fall within the true spirit and scope of the invention.

Having thus described our invention, that which we claim as new and desire to secure by Letters Patent of the United States is:

1. In an optical system, apparatus for achieving Scheimpflug correction of an image tilted with respect to the optical axis of the system using Scheimpflug relay lenses comprising:
   a. a shaft intersecting the optical axis of the system at right angles upon which are mounted a multiplicity of Scheimpflug relay lenses, said lenses having their optical axes transverse to the axis of said shaft;
   b. means for rotating said shaft with the lenses mounted thereon, to achieve Scheimpflug correction of a tilted image;
   c. reflective means for bending the optical path to direct light in opposite directions through alternate ones of said relay lenses.

2. The apparatus of claim 1 further comprising non-tiltable field lenses between selected pairs of said relay lenses said field lenses being split into two elemental lenses each located a distance equal to its focal length from its respective relay lens, said configuration forming a telecentric lens arrangement symmetrical about the intermediate image plane between said relay lens pairs such that adjustment of the focal length of said field lenses will not affect the collimated image which results at said intermediate image plane.

3. The apparatus of claim 1 further comprising non-tilting field flattening lenses consisting of lens elements of two Galilean telescopes mounted back-to-back, the arrangement being symmetrical about the intermediate image plane between selected pairs of relay lenses.

4. The apparatus of claim 1 further comprising field flattening lenses, the elements of which comprise two Galilean telescopes having a combined common negative element eyepiece, said eyepiece being placed at the locus of the intermediate image plane between selected pairs of relay lenses.

5. The apparatus of claim 1 wherein said reflective means comprise the internal reflecting surfaces of porro prisms.

6. The apparatus of claim 5 wherein selected said porro prisms are modified to include optical means comprising two Galilean telescopes with a common negative element eyepiece.

7. The apparatus of claim 1 including apparatus for varying said optical path comprising:
   a. first translating means for adjusting the position of said relay lens shaft along the optical axis of the system; and
   b. second translating means for adjusting the position of selected ones of said reflective means along said optical axis of the system.

8. The apparatus of claim 2 further including means for adjusting the focal length of said field lenses.

9. The apparatus of claim 1 having adjustable optical path lengths and the apparatus for adjusting said optical path comprising:
   a. conversion means for converting the rotary motion imparted to said relay lens shaft to a linear motion to be applied to;
   b. first linkages connected to said conversion means to translate said relay lens shaft linearly along the optical axis of the system and to;
   c. second linkages connected to said conversion means to translate selected ones of said reflective means linearly along said optical axis of the system.

10. The apparatus of claim 2 having adjustable optical path lengths and the apparatus for making such adjustment comprises:
   a. conversion means for converting the rotary motion imparted to said relay lens shaft to a linear motion to be applied to;
   b. linkages connected to said conversion means to transmit said linear motion so as to adjust the focal length of said field lenses.

11. The apparatus of claim 1 comprising modular assemblies of said Scheimpflug relays each of said modules having a magnification equal to unity.

12. In an optical system, apparatus for achieving Scheimpflug correction of an image tilted with respect to the optical axis of the system using Scheimpflug relay modules of unity magnification comprising:
  a. means for rotating a multiplicity of relay lenses mounted on a common shaft intersecting the optical axis of the system at right angles such that a common means of simultaneously rotating all said lenses to achieve Scheimpflug correction may be employed;
  b. field lenses for forming a collimated image at the intermediate image plane between pairs of said relay lenses such that adjusting the focal length of said field lenses will not affect the focus of said collimated image;
  c. field flattening lenses for compensating for field curvature, said lenses comprising the lens elements of two Galilean telescopes mounted back-to-back, the arrangement being symmetrical about the plane of said collimated image;
  d. reflective means for bending the optical path to direct light in opposite directions through alternate ones of said realy lenses.
  e. first translating means for imparting linear motion to said common relay lens shaft whereby compensating changes in optical path length dictated by rotation of said relay lenses may be achieved;
  f. second translating means for imparting linear motion to selected said reflective means whereby further compensatory changes in optical path length may be achieved as dictated by rotation of said relay lenses;
  g. third translating means for adjusting the focal length of said field lenses to compensate for rotation of said relay lenses;
  h. conversion means for changing the rotary motion imparted to said common relay lens shaft to a linear motion; and
  i. linkages to transmit said linear motion to each of said translating means.

* * * * *